T. W. ROBERTSON.
RUNNER FOR WHEELED VEHICLES.
APPLICATION FILED SEPT. 18, 1913.
1,123,800.
Patented Jan. 5, 1915.
Fig. I.
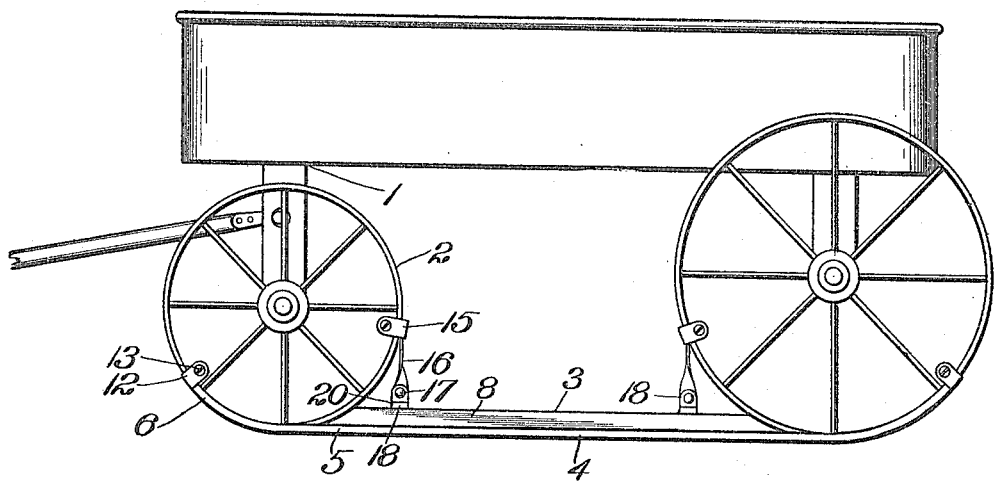
Fig. II.
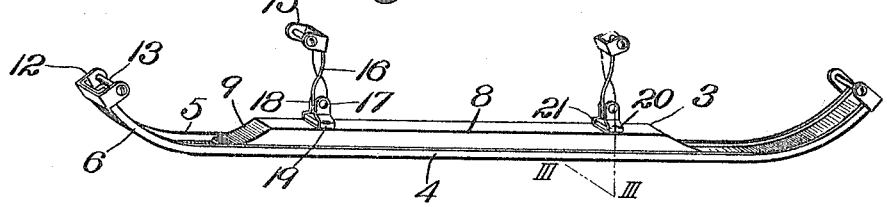
Fig. III.
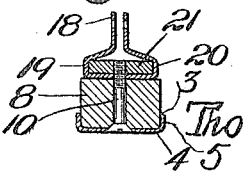
WITNESSES:
Arthur W. Caps.
R. F. Thomas
INVENTOR
Thomas W. Robertson.
BY
Arthur E. Crown,
ATTORNEY

UNITED STATES PATENT OFFICE.

THOMAS W. ROBERTSON, OF KANSAS CITY, MISSOURI.

RUNNER FOR WHEELED VEHICLES.

1,123,800.   Specification of Letters Patent.   Patented Jan. 5, 1915.

Application filed September 18, 1913. Serial No. 790,535.

*To all whom it may concern:*

Be it known that I, THOMAS W. ROBERTSON, a citizen of the United States, residing at Kansas City, in the county of Jackson and State of Missouri, have invented certain new and useful Improvements in Runners for Wheeled Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a runner for wheeled vehicles, and has for its principal object to provide a sled or sleigh runner, which may be attached to both wheels at the same side of a wagon, buggy or other wheeled vehicle to hold the wheels against revoluble movement and serve as a runner upon which the vehicle may be carried. In accomplishing this object, I have provided details of structure hereinafter described and illustrated in the accompanying drawings, wherein:—

Figure I is a side elevation of a wheeled vehicle equipped with a runner constructed according to my invention. Fig. II is a detail perspective of the runner. Fig. III is a cross-section on the line III—III Fig. II.

Referring more in detail to the parts:—

1 designates a wheeled vehicle of any ordinary construction, and 2 the wheels, which support the body of the vehicle, and are adapted for independent revoluble movement.

3 designates a runner having a tread portion 4 preferably composed of metal, and comprising upturned side flanges 5, and the end portions 6, which latter are turned upwardly on the same curvature as the front and rear wheels of the vehicle to which the runner is to be applied. Fixed to the tread portion 6, preferably by a bolt 10, is a central brace or filler 8 having concave ends 9 each adapted to bear against the front and rear wheels of the vehicle and coöperate with the upwardly curved end portions 6 to form a seat for said wheels.

Each of the end portions 6 is provided with a stirrup 12, which is adapted to lie over the sides of the vehicle wheels, and carries a bolt 13, which is adapted to project between the ears of the stirrup within the rim of the wheel to lock the stirrup and the runner firmly to the wheels at the front and rear of the vehicle. Hingedly connected with the runner are stirrups 15, which are adapted for application to the front and rear wheels of the vehicle at inside positions, to assist the stirrups on the end portions in holding the runner to the wheels, and for holding the wheels against revoluble movement. The stirrups 15 may be of the same construction as the stirrups 12, and preferably comprise a twisted bar 16 having its lower end pivotally mounted on a pin 17 that projects between the ears 18 of a bracket 19, that is fixed to the runner. The bracket 19 preferably comprises a single piece of sheet metal folded upon itself to form a base 20, and containing a nut 21 into which the bolt 10 that secures the tread portion of the runner to the filler block is projected.

In using the device, presuming the parts to be constructed and assembled as described; when the vehicle is to be used as a sled or sleigh, the runners are placed beneath the wheels and the saddles connected therewith, so that the wheels fit within their seats and are held firmly against revoluble movement, and locked securely to the runner, so that when the vehicle is drawn it will travel on the runners which support the wheels. When the vehicle is to be used again as a wheeled conveyance, the body is jacked, so that the runners may be removed and the vehicle easily and quickly transformed from one form of a conveyance to the other.

It is apparent that the runners may be carried on or under the vehicle so that should a thaw occur while the runners are in place, and the vehicle some distance from its destination; the runners may be removed in order to transform the vehicle back into a wheeled conveyance and thereby save the strain on the animals drawing the vehicle, which would occur if it were necessary to drag the runners over an uncovered roadway.

Having thus described my invention, what I claim as new therein and desire to secure by Letters-Patent, is:—

A runner for wheeled vehicles comprising a channeled tread member having upturned ends, a clamp on each upturned end of said tread member for securing the tread member to the vehicle wheels, a stiffening member seated in said channeled tread member and adapted for abutment against the vehicle wheels, a hinge member near each end of said stiffening member, having spaced lips and an apertured base, a nut on said base, a screw passing through said channeled tread member, stiffening member and base, and threaded into said nut, a brace hingedly mounted in each of said hinge members, and a clamp on said braces adapted for attachment to an adjacent wheel.

In testimony whereof I affix my signature in presence of two witnesses.

THOMAS W. ROBERTSON.

Witnesses:
R. F. THOMAS,
ARTHUR W. CAPS.

Copies of this patent may be obtained for five cents each, by addressing the "Commissioner of Patents, Washington, D. C."